United States Patent
Mori (10) Patent No.: US 10,256,577 B2
(45) Date of Patent: Apr. 9, 2019

(54) CONNECTOR

(71) Applicant: YAZAKI CORPORATION, Tokyo (JP)

(72) Inventor: Yuki Mori, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/000,825

(22) Filed: Jun. 5, 2018

(65) Prior Publication Data

US 2018/0366883 A1 Dec. 20, 2018

(30) Foreign Application Priority Data

Jun. 14, 2017 (JP) .................................. 2017-116939

(51) Int. Cl.
*H01R 9/03* (2006.01)
*H01R 13/6593* (2011.01)
*H01R 13/52* (2006.01)

(52) U.S. Cl.
CPC ..... *H01R 13/6593* (2013.01); *H01R 13/5205* (2013.01)

(58) Field of Classification Search
CPC ......................... H01R 13/6593; H01R 13/5205
USPC .... 439/607.41, 272, 345, 556, 587, 98, 271, 439/589
See application file for complete search history.

(56) References Cited

U.S. PATENT DOCUMENTS

| | | | | |
|---|---|---|---|---|
| 5,660,564 A | * | 8/1997 | Yamanashi | H01R 13/741 439/556 |
| 6,796,838 B2 | * | 9/2004 | Yoshioka | H01R 13/648 439/607.01 |
| 7,942,699 B1 | * | 5/2011 | Rossman | H01R 9/032 439/607.41 |
| 2008/0119088 A1 | * | 5/2008 | Noh | H01R 9/0518 439/607.41 |
| 2011/0086544 A1 | * | 4/2011 | Yoshioka | H01R 13/4362 439/587 |
| 2011/0318951 A1 | * | 12/2011 | Armacost | H01R 13/745 439/345 |
| 2014/0235104 A1 | * | 8/2014 | Wang | H01R 13/648 439/607.41 |
| 2015/0244103 A1 | * | 8/2015 | Kashiwada | H01R 13/5213 439/272 |

FOREIGN PATENT DOCUMENTS

JP 2014-160589 A 9/2014

* cited by examiner

*Primary Examiner* — Abdullah A Riyami
*Assistant Examiner* — Nelson R. Burgos-Guntin
(74) *Attorney, Agent, or Firm* — Kenealy Vaidya LLP (57) ABSTRACT

In a connector, a tapered portion is formed at a corner portion between a housing and a flange portion so as to be formed in parallel to a chamfered portion formed on an edge of a mounting hole in a casing. An annular seal member of the connector is mounted on an outer peripheral surface of the housing at a front side of the flange portion in an insertion direction of the housing, and is brought into close contact with an outer peripheral surface of the housing and an inner peripheral surface of the mounting hole so as to seal therebetween. A lip portion abutting on the flange portion is provided on a rear side of the seal member in the insertion direction. An outer peripheral surface and an inner peripheral surface of the lip portion are formed in parallel to the tapered portion.

3 Claims, 6 Drawing Sheets

CONNECTOR

CROSS REFERENCE TO RELATED APPLICATIONS

This application is based on Japanese Patent Application (No. 2017-116939) filed on Jun. 14, 2017, the contents of which are incorporated herein by way of reference.

BACKGROUND

The present invention relates to a connector.

A connector which is connected to a device such as a motor, a battery, or an inverter is inserted into a mounting hole formed in a casing of the device and fixed to the casing by fastening a flange portion with a screw (see JP-A-2014-160589, for example). In this connector, a seal member is provided in the part to be inserted into the mounting hole to seal the mounted part, thereby preventing penetration of water or oil into the casing.

SUMMARY

An object thereof is to provide a connector with improved sealing properties at a portion to be assembled to a casing.

In order to achieve the object described above, a connector according to the invention is characterized by the following configurations (1) to (3).

(1) A connector including:
a housing having a cylindrical shape and configured to be fitted into a mounting hole having a chamfered portion in an edge, the mounting hole being formed in a casing;
a flange portion provided on an outer periphery of the housing and configured to abut on an outer surface of the casing;
a tapered portion formed at a corner portion between the housing and the flange portion so as to be formed in parallel with respect to the chamfered portion;
a seal member, having an annular shape, and mounted on an outer peripheral surface of the housing at a front side of the flange portion in an insertion direction in which the housing is inserted into the mounting hole, and configured to be brought into close contact with the outer peripheral surface of the housing and an inner peripheral surface of the mounting hole so as to seal therebetween; and
a lip portion, provided on a rear side of the seal member in the insertion direction, and abutting on the flange portion, wherein
an outer peripheral surface of the lip portion and an inner peripheral surface of the lip portion are formed in parallel with respect to the tapered portion.

(2) The connector according to (1), wherein
the casing is made of metallic material,
the housing is made of a metallic material having conductive properties, and
an end of a shielded wire in which an inner sheath, a shield layer, and an outer sheath are provided around a conductor in this order is connected to the housing, and the shield layer is conducted to the housing.

(3) The connector according to (1) or (2), wherein
the tapered portion and the lip portion are respectively formed with at least one of a concave portion and a convex portion which are concavo-convexly engaged with each other and formed in at intervals in a circumferential direction of the housing.

DETAILED DESCRIPTION OF EXEMPLIFIED EMBODIMENTS

In the casing to which the connector is assembled, the penetration of water and oil into the casing can be prevented by the seal member. However, there is a concern that the casing can be corroded by moisture which enters the gap located further outside of the casing than the seal member in the mounting hole.

The invention has been made in view of the circumstances described above, and an object thereof is to provide a connector with improved sealing properties at a portion to be assembled to a casing.

Hereinafter, an embodiment of the invention will be described with reference to the accompanying drawings.

Figure 1:
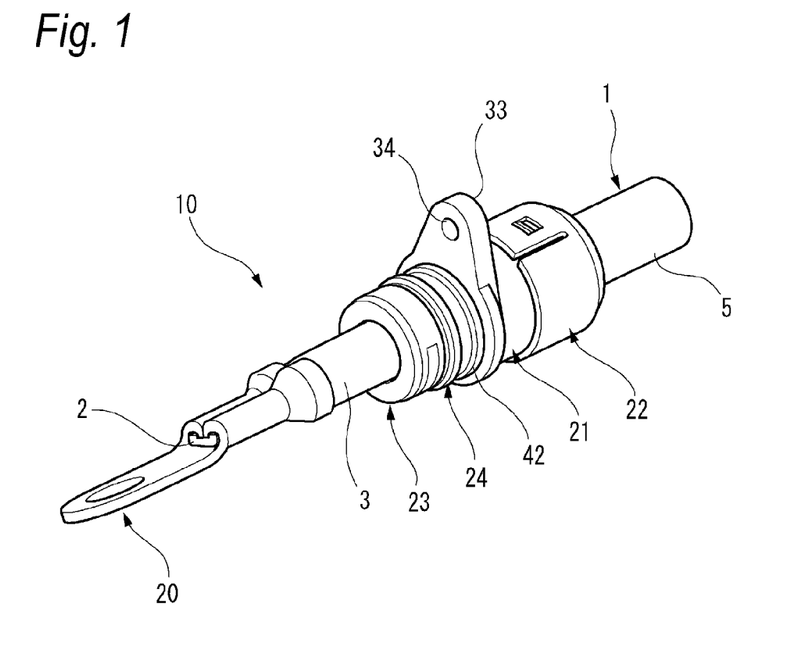
FIG. 1 is a perspective view illustrating a connector according to an embodiment.
Figure 2:
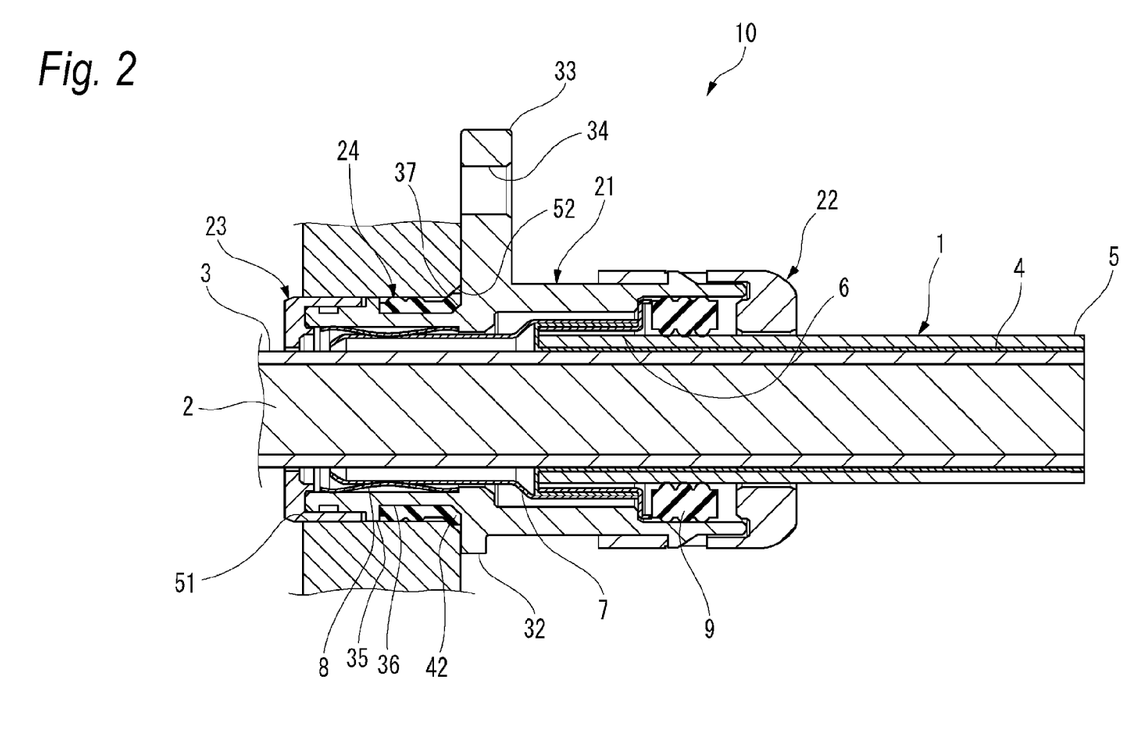
FIG. 2 is a cross-sectional view illustrating the connector according to the embodiment in a state of being assembled to a casing.

FIG. 1 is a perspective view illustrating a connector according to the embodiment. FIG. 2 is a cross-sectional view illustrating the connector according to the embodiment in a state of being assembled to a casing.

As illustrated in FIGS. 1 and 2, a connector 10 according to the embodiment is connected to an end of a shielded wire 1. The connector 10 is used, for example, for wiring of hybrid cars or electric vehicles. The connector 10 is a shield connector for connecting, for example, a motor and an inverter or an inverter and a battery or the like with the shielded wire 1. The connector 10 connects the shielded wire 1 to a casing 50 of, for example, an inverter, a motor, or a battery. The casing 50 is made of a metal such as iron, for example, and includes a mounting hole 51 into which the connector 10 is inserted and mounted. On the mounting hole 51 of the casing 50, a chamfered portion 52 is formed on an edge on the outer side of the casing 50.

The shielded wire 1 is a coaxial cable which includes a conductor 2 made of a stranded wire obtained by twisting a plurality of strands, an inner sheath 3 made of an insulating synthetic resin or the like covering the periphery of the conductor 2, a shield layer 4 made of a conductor such as a braid or the like provided around the inner sheath 3, and an outer sheath 5 made of an insulating synthetic resin or the like covering the periphery of the shield layer 4.

In the shielded wire 1, the conductor 2 and the shield layer 4 are exposed at the end thereof. A shield terminal 6 which has a cylindrical shape and is made of a conductive material is mounted on an end of the outer sheath 5. In the portion where the shield terminal 6 is mounted, the shield layer 4 exposed from the outer sheath 5 is folded over and covers the portion. In the portion where the shield layer 4 is folded back, a shield sleeve 7 made of a conductive material is mounted from the tip end side. A shield contact 8 made of a conductive material is mounted on the tip end side of the shield sleeve 7. In addition, a rubber stopper 9 having an annular shape is attached to the shielded wire 1.

The connector 10 includes a terminal 20, a housing 21, a rear holder 22, an under holder 23, and a seal member 24.

The terminal 20 is crimped and fixed to the conductor 2 which is exposed at the end of the shielded wire 1. The terminal 20 is connected to the wiring of the device in the casing 50. The housing 21 is formed in a cylindrical shape and a flange portion 32 is formed in the middle portion in the axial direction. The housing 21 having the flange portion 32 formed thereon is made of aluminum which is a metal different from that of the casing 50, for example. The end of the shielded wire 1 to which the shield terminal 6, the shield sleeve 7, the shield sleeve 8 and the rubber stopper 9 are attached is fitted to the housing 21. The shield layer 4 and the housing 21 are conducted through the shield terminal 6, the shield sleeve 7 and the shield sleeve 8 by fitting the end of the shielded wire 1 into this housing 21. Further, the housing 21 is sealed between the inner circumferential surface at the rear end side and the outer circumferential surface of the shielded wire 1 by the fitted rubber stopper 9.

The flange portion 32 is formed so as to protrude outwardly from the housing 21 and a part of the flange portion 32 is a fixing plate portion 33 having a triangular shape as viewed from the front. An insertion hole 34 is formed in the fixing plate portion 33.

The rear holder 22 is attached to the rear end side of the housing 21 to prevent bending of the shielded wire 1. The under holder 23 is attached to the tip end side of the housing 21 to prevent bending of the conductor 2 which is covered with the outer sheath 5. The seal member 24 is attached to the housing 21 from the tip end side and is disposed between the flange portion 32 and the under holder 23.

Figure 3:
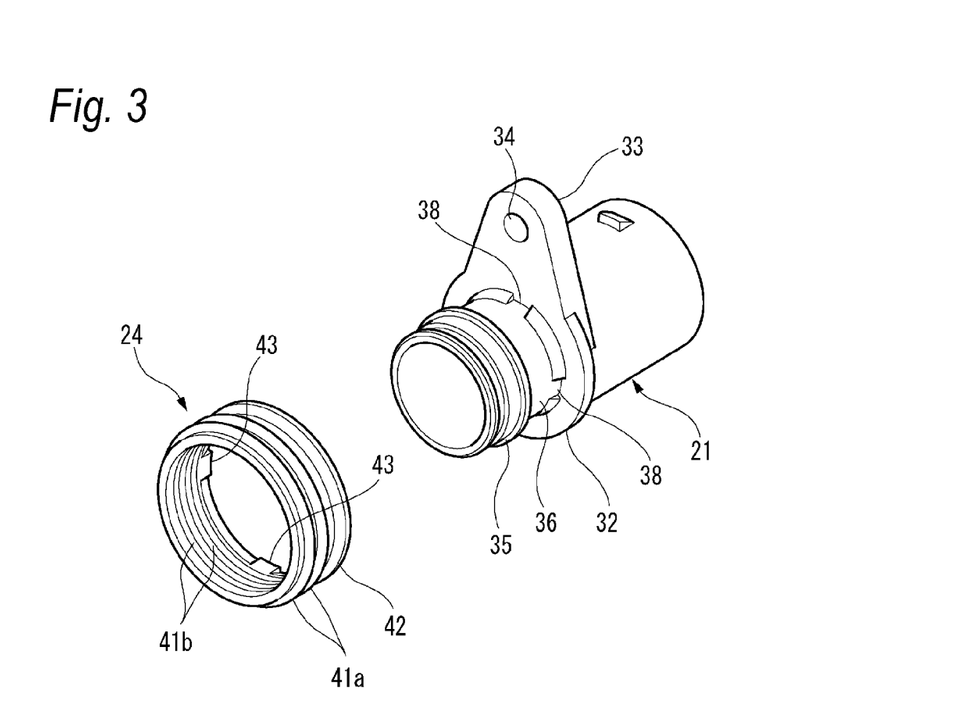
FIG. 3 is a perspective illustrating a housing and a seal member.
Figure 4:
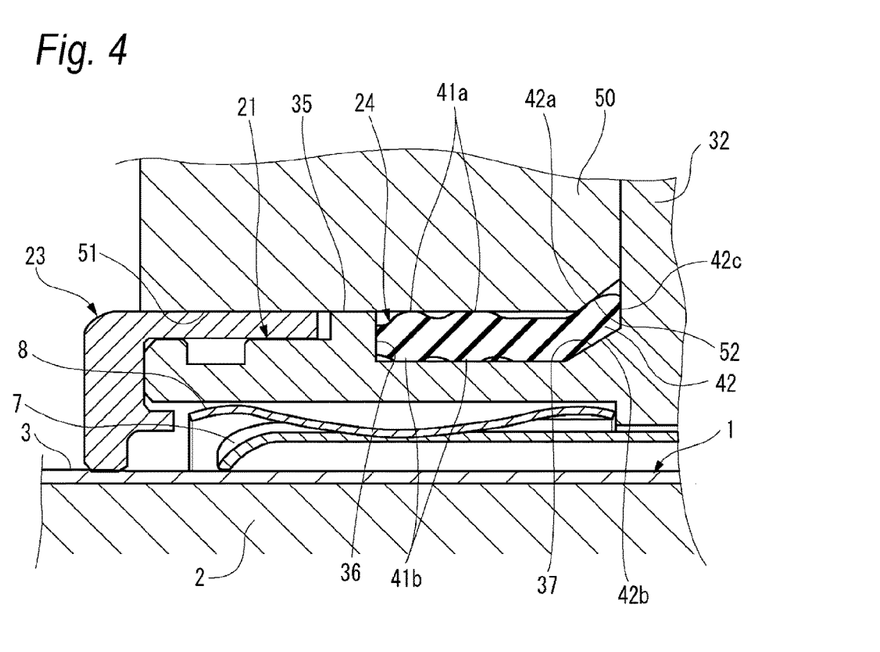
FIG. 4 is a cross-sectional view illustrating a sealed state in which the housing is fitted into a mounting hole.

FIG. 3 is a perspective view of the housing and the seal member. FIG. 4 is a cross-sectional view in a state where the housing is fitted into the mounting hole which illustrates a sealed state.

As illustrated in FIGS. 3 and 4, the housing 21 includes an annular protrusion portion 35 on the tip end side from the flange portion 32, the annular protrusion portion 35 protruding in the circumferential direction. A portion between the annular protrusion portion 35 and the flange portion 32 is used as an accommodating concave portion 36. In the accommodating concave portion 36, a tapered portion 37 is formed in the corner portion with the flange portion 32 in the circumferential direction. The inclination angle with respect to the axis of the tapered portion 37 is the same as the inclination angle with respect to the axis of the chamfered portion 52 of the mounting hole 51. Therefore, the tapered portion 37 is parallel to the chamfered portion 52 of the mounting hole 51 of the casing 50. Four concave portions 38 are formed in the tapered portion 37. The concave portions 38 are formed at equal intervals in the circumferential direction.

The seal member 24 is formed in an annular shape. Further, the seal member 24 is disposed in the housing concave portion 36 and attached to the housing 21. The seal member 24 is made of an elastic material such as rubber, for example. The seal member 24 includes protrusion portions 41a and 41b which respectively extend in the circumferential direction on the outer peripheral side and the inner peripheral side. Also, the seal member 24 includes a lip portion 42 on the rear end side thereof. In the lip portion 42, the end surface 42c is a vertical surface perpendicular to the axial direction. Therefore, the seal member 24 is attached to the accommodating concave portion 36 of the housing 21, in such a manner that the end face 42c of the lip portion 42 is brought into close contact with the flange portion 32.

The lip portion 42 is inclined so that an outer peripheral surface 42a and an inner peripheral surface 42b are gradually enlarged toward the rear end. The inclination angle with respect to the axis of the outer peripheral surface 42a and the inner peripheral surface 42b of the lip portion 42 is the same as the inclination angle with respect to the axis of the chamfered portion 52 of the mounting hole 51. Accordingly, the outer peripheral surface 42a and the inner peripheral surface 42b of the lip portion 42 are parallel to the tapered portion 37. As a result, the outer peripheral surface 42a and the inner peripheral surface 42b of the lip portion 42 are parallel to the chamfered portion 52 of the mounting hole 51 of the casing 50.

Four convex portions 43 are formed on the inner peripheral surface 42b of the lip portion 42. The convex portions 43 are formed at equal intervals in the circumferential direction of the housing 21. The convex portions 43 are fitted into concave portions 38 which are formed in the accommodating concave portion 36 of the housing 21. The seal member 24 is prevented from rotating with respect to the housing 21 by concavo-convexly engaging the concave portions 38 and the convex portions 43.

To attach the connector 10 to the casing 50, first, the connector 10 is inserted into the mounting hole 51 of the casing 50 from the terminal 20 side. When the flange portion 32 of the connector 10 is inserted until it abuts against the outer surface of the casing 50, the insertion hole 34 of the fixing plate portion 33 of the flange portion 32 is aligned with a screw hole (not illustrated) which is formed in the casing 50. Then, a fastening screw (not illustrated) is inserted into the insertion hole 34 of the fixing plate portion 33 and the screw is screwed into the screw hole of the casing 50. Therefore, the flange portion 32 is fastened to the outer surface of the casing 50 by the screw in a state where the connector 10 is inserted into the mounting hole 51. In this way, when the connector 10 is assembled to the casing 50, the flange portion 32 of the housing 21 comes into contact with the outer surface of the casing 50. Therefore, the shield layer 4 of the shielded wire 1 is electrically connected to the casing 50 and a shielding effect is obtained. Therefore, the influence of external noise such as electromagnetic waves is prevented, and radiation noise such as electromagnetic waves from the shielded wire 1 is restrained from leaking to the outside.

When the connector 10 is mounted on the casing 50 as described above, the seal member 24 is compressed by the outer peripheral surface of the housing 21 and the inner peripheral surface of the mounting hole 51, and further the protrusion portions 41a and 41b come into close contact with the outer peripheral surface of the housing 21 and the inner peripheral surface of the mounting hole 51. Therefore, the mounting hole 51 into which the housing 21 of the connector 10 is inserted and mounted is sealed by the seal member 24.

In addition, the lip portion 42 of the seal member 24 is pressed by the flange portion 32, so that the end surface 42c comes into close contact with the flange portion 32 and the outer peripheral surface 42a comes into close contact with the chamfered portion 52 of the mounting hole 51, and further the inner peripheral surface 42b comes into close contact with the tapered portion 37 of the housing 21. As a result, in the mounting hole 51, the lip portion 42 enters the edge of the casing 50 on the outer side without a gap.

Figure 5:
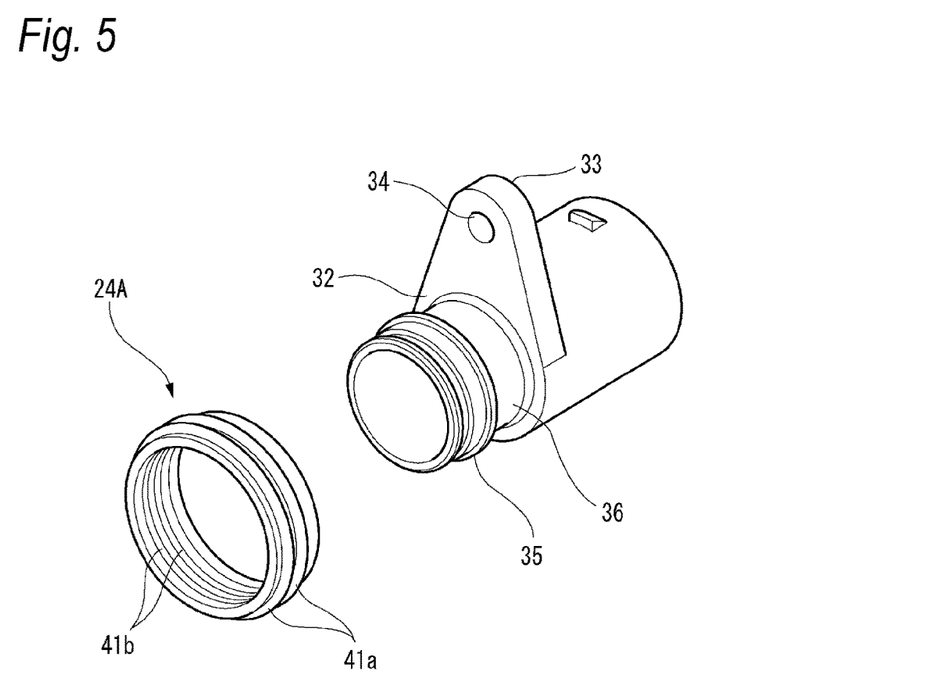
FIG. 5 is a perspective view illustrating a housing and a seal member without a lip portion for describing a reference example.
Figure 6:
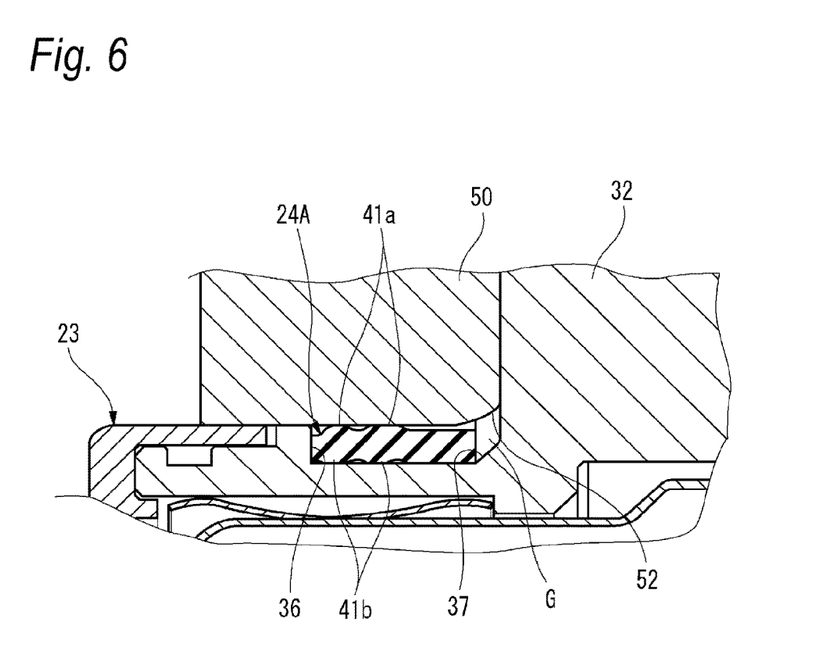
FIG. 6 is a cross-sectional view illustrating a sealed state, in which the housing is fitted into a mounting hole, by the seal member without the lip portion for describing the reference example.

As illustrated in FIGS. 5 and 6, when the seal member 24A without the lip portion 42 is used, a gap G is formed in the outer edge of the casing 50 in the mounting hole 51. In this casing, there is a concern that the casing 50 can corrode by moisture entering the gap G. Especially, when the casing 50 is made of iron and the housing 21 of the connector 10 is made of aluminum, conduction properties between the casing 50 and the flange portion 32 of the housing 21 are reduced due to galvanic corrosion occurring between different metals, and thus there is a concern that shielding effect cannot be obtained sufficiently. Also, since there is no lip portion 42, the seal member 24A does not have the convex portion 43 of the lip portion 42 and the concave portion 38 of the tapered portion 37. Therefore, there is no anti-rotation function due to the concavo-convex engagement between the convex portion 43 and the concave portion 38.

On the contrary, according to the connector 10 of the embodiment, a lip portion 42 abutting on the flange portion 32 is provided on the rear side in the insertion direction of the seal member 24 which has an annular shape and performs sealing by being brought into close contact with the outer peripheral surface of the housing 21 and the inner peripheral surface of the mounting hole 51. By fitting the housing 21 into the mounting hole 51, the lip portion 42 of the seal member 24 enters the edge further on the rear side in the insertion direction than the sealing portion by the seal member 24 in the mounting hole 51 without a gap. Therefore, sealing properties in the portion which is further on the rear side in the insertion direction than the sealing portion by the seal member 24 in the mounting hole 51 are increased, and thus the corrosion resistance of the casing 50 can be improved.

In the lip portion 42, the outer peripheral surface 42a and the inner peripheral surface 42b are formed in parallel with the chamfered portion 52 of the mounting hole 51. Further, the tapered portion 37 which is formed at a corner portion between the housing 21 and the flange portion 32 is formed in parallel with the chamfered portion 52 of the mounting hole 51. Therefore, when the lip portion 42 is pressed by the flange portion 32 during assembly to the casing 50, the lip portion 42 is brought into close contact with the chamfered portion 52 and the tapered portion 37 with even surface pressure. As a result, it is possible to further improve the sealing effect by the seal member 24 while biting of the lip portion 42 with respect to the portion between the outer surface of the casing 50 and the flange portion 32 and turnover of the lip portion 42 are prevented.

According to the embodiment, corrosion of the casing 50 is prevented, and thus it is possible to maintain a favorable conduction state between the casing 50 and the housing 21. Especially, even when the casing 50 and the housing 21 are made of dissimilar metals, galvanic corrosion caused by moisture entering between dissimilar metals can be prevented, and a decrease in conductivity between the casing 50 and the housing 21 can be prevented. Therefore, it possible to maintain a favorable shielding effect by the shield layer 4 of the shielded wire 1.

Furthermore, the seal member 24 having an annular shape is prevented from rotating in the lip portion 42 by concavo-convexly engaging the concave portion 38 and the convex portion 43. As a result, it is possible to prevent displacement of the lip portion 42 of the seal member 24 when the housing 21 is fitted into the mounting hole 51 and it is possible to obtain the favorable sealing effect by the lip portion 42. Especially, when the mounting hole 51 and the housing 21 have different cross-sectional shapes such as an elliptical shape or the like, it is possible to obtain a required sealing effect by mounting the seal member 24 formed in a different annular shape such as an elliptical shape on the housing 21 in a state where the seal member 24 is positioned.

It is to be noted that the invention is not limited to the embodiment described above, but can be appropriately modified, improved, and the like. In addition, materials, shapes, dimensions, numbers, placement locations, and the like of the constituent elements in the embodiment described above are arbitrary as far as the invention can be achieved and are not limited.

Here, the features of the embodiment of the connector according to the present invention described above are respectively summarized briefly in the following [1] to [3].

[1] The connector including:
a housing (21) having a cylindrical shape and configured to be fitted into a mounting hole (51) having a chamfered portion (52) in an edge, the mounting hole being formed in a casing (50),
a flange portion (32) provided on an outer periphery of the housing (21) and configured to abut on an outer surface of the casing (50),
a tapered portion (37) formed at a corner portion between the housing (21) and the flange portion (32) so as to be formed in parallel with respect to the chamfered portion (52),
a seal member (24), having an annular shape, and mounted on an outer peripheral surface of the housing (21) at a front side of the flange portion (32) in an insertion direction in which the housing (21) is inserted into the mounting hole (51), and configured to be brought into close contact with the outer peripheral surface of the housing (21) and an inner peripheral surface of the mounting hole (51) so as to seal therebetween, and
a lip portion (42), provided on a rear side of the seal member (24) in the insertion direction, and abutting on the flange portion (32), wherein
an outer peripheral surface (42a) of the lip portion (42) and an inner peripheral surface (42b) of the lip portion (42) are formed in parallel with respect to the tapered portion (37).

[2] The connector according to [1], wherein
the casing (50) is made of metallic material,
the housing (21) is made of a metallic material having conductive properties, and
an end of a shielded wire (1) in which an inner sheath (3), a shield layer (4), and an outer sheath (5) are provided around a conductor (2) in this order is connected to the housing (21), and the shield layer (4) is conducted to the housing (21).

[3] The connector according to [1] or [2], wherein
the tapered portion (37) and the lip portion (42) are respectively formed with at least one of a concave portion (38) and a convex portion (43) which are concavo-convexly engaged with each other and formed in at intervals in a circumferential direction of the housing (21).

According to the connector of the configuration described above, the lip portion abutting on the flange portion is provided on the rear side in the insertion direction of the annular seal member which is brought into close contact with the outer peripheral surface of the housing and the inner peripheral surface of the mounting hole to perform sealing. When the housing is fitted into the mounting hole, the lip portion of the seal member enters an edge in the mounting hole on the rear side in the insertion direction compared to the sealed portion by the seal member, without a gap. Therefore, the sealing properties by the seal member is improved on the rear side in the insertion direction compared to the sealed portion in the mounting hole, and it is possible to improve the corrosion resistance of the casing.

In the lip portion, the outer peripheral surface and the inner peripheral surface are formed in parallel with the chamfered portion of the mounting hole and, further, the tapered portion formed at the corner portion between the housing and the flange portion is formed in parallel with the chamfered portion of the mounting hole. Therefore, when the lip portion is pressed by the flange portion during assembly to the casing, the lip portion is brought into close contact with the chamfered portion and the tapered portion with even surface pressure. As a result, it is possible to further improve the sealing effect by the seal member while biting of the lip portion with respect to the portion between the outer surface of the casing and the flange portion and turnover of the lip portion are prevented.

According to the connector of the configuration described above, corrosion of the casing is prevented, and thus it is possible to maintain a favorable conduction state between the casing and the housing. Especially, even when the casing and the housing are made of dissimilar metals, galvanic corrosion caused by moisture entering between dissimilar metals can be prevented, and a decrease in conductivity between the casing and the housing can be prevented. Therefore, it possible to maintain a favorable shielding effect by the shield layer of the shielded wire.

According to the connector of the configuration of described above, the seal member having an annular shape is prevented from rotating in the lip portion by concavo-convexly engaging the concave portion and the convex portion. As a result, it is possible to prevent displacement of the lip portion of the seal member when the housing is fitted into the mounting hole and it is possible to obtain the favorable sealing effect by the lip portion. Especially, when the mounting hole and the housing have different cross-sectional shapes such as an elliptical shape or the like, it is possible to obtain a required sealing effect by mounting the seal member formed in a different annular shape such as an elliptical shape on the housing in a state where the seal member is positioned.

According to the invention, it is possible to provide a connector in which sealing properties at the portion to be assembled to the casing is improved.

What is claimed is:

1. A connector comprising:
a housing having a cylindrical shape and configured to be fitted into a mounting hole having a chamfered portion in an edge, the mounting hole being formed in a casing;
a flange portion provided on an outer periphery of the housing and configured to abut on an outer surface of the casing;
a tapered portion formed at a corner portion between the housing and the flange portion so as to be formed in parallel with respect to the chamfered portion;
a seal member, having an annular shape, and mounted on an outer peripheral surface of the housing at a front side of the flange portion in an insertion direction in which the housing is inserted into the mounting hole, and configured to be brought into close contact with the outer peripheral surface of the housing and an inner peripheral surface of the mounting hole so as to seal therebetween; and
a lip portion, provided on a rear side of the seal member in the insertion direction, and abutting on the flange portion, wherein
an outer peripheral surface of the lip portion and an inner peripheral surface of the lip portion are formed in parallel with respect to the tapered portion.

2. The connector according to claim 1, wherein
the casing is made of metallic material,
the housing is made of a metallic material having conductive properties, and
an end of a shielded wire in which an inner sheath, a shield layer, and an outer sheath are provided around a conductor in this order is connected to the housing, and the shield layer is conducted to the housing.

3. The connector according to claim 1, wherein
the tapered portion and the lip portion are respectively formed with at least one of a concave portion and a convex portion which are concavo-convexly engaged with each other and formed in at intervals in a circumferential direction of the housing.

* * * * *